Sept. 26, 1950    J. THOMSON ET AL    2,523,887
DRIVE FOR ENDLESS CHAIN SCRAPER CONVEYERS
Filed May 17, 1946    2 Sheets-Sheet 1
FIG: 1.
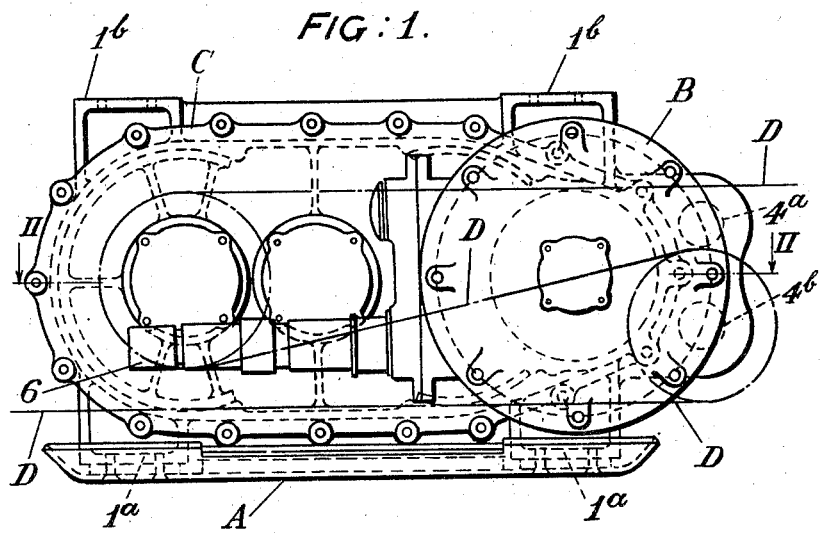
FIG: 2.
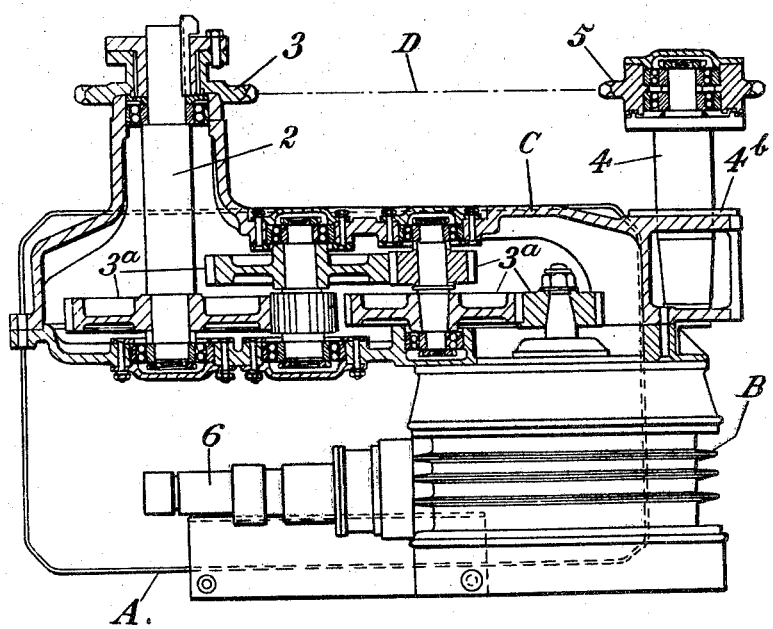
Inventors
JAMES THOMSON
THOMAS McCULLOCH
By Otto Munk
Their Attorney

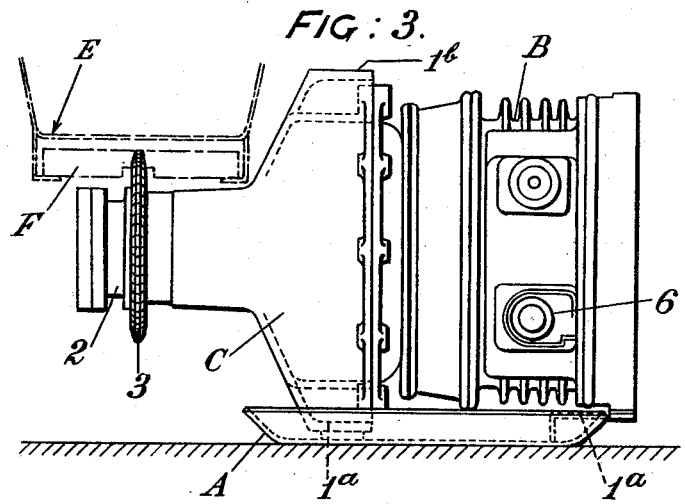

Patented Sept. 26, 1950

2,523,887

UNITED STATES PATENT OFFICE 2,523,887

DRIVE FOR ENDLESS-CHAIN SCRAPER CONVEYERS

James Thomson and Thomas McCulloch, Glasgow, Scotland, assignors to Mavor & Coulson, Limited, Glasgow, Scotland Application May 17, 1946, Serial No. 670,639
In Great Britain May 15, 1945

Section 1, Public Law 690, August 8, 1946
Patent expires May 15, 1965

4 Claims. (Cl. 198—203)

This invention refers to endless-chain scraper conveyors of the sectional type, i. e. conveyors of the type in which the frame can be extended or reduced in length by the addition or removal of sections, the chain being correspondingly extended or reduced in length by the addition or removal of sections of chain. The invention is particularly concerned with conveyors of this type for use underground in coal mines.

The existing practice in driving such conveyors is to provide a driving gear comprising a motor and reduction gearing and to transmit power from this driving gear to one or other of the end sprocket wheels of the conveyor.

An object of this invention is to provide a conveyor of the type stated for use in mines which will be capable of ready adaptation to the particular conditions under which it is to operate, and the height of which in general will be low. This adaptability is not obtained in scraper conveyors as hitherto used.

Another object of the invention is to provide a conveyor of the type stated in which the driving gear will be adaptable for location on either side of the conveyor. The usual driving gear in scraper conveyors hitherto used do not lend themselves to this.

Another object of the invention is to render the driving gear suitable for location on either the right hand or left hand side of the conveyor, by constructing the motor, gearing and sprocket wheels as a unit adapted to be used in either of two positions which differ in that the unit is turned upside down.

To permit of the same relative disposition of the driving sprocket wheel and an associated idler sprocket wheel when the unit is turned upside down, a second mounting is provided to which the idler sprocket wheel can be transferred.

The invention will now be described by way of example with reference to the accompanying drawings, in which:

Figure 1 is a side elevation, Figure 2 is a plan view partly in section approximately on line II—II of Figure 1, and Figure 3 is an end view showing an example of scraper conveyor driving gear in accordance with the invention.

Figures 4, 5, 6 and 7 are diagrammatic views to indicate how the driving gear can be applied to opposite sides of the conveyor.

Figures 8 and 9 are diagrammatic views illustrating two different ways in which the driving gear can be embodied in the conveyor.

Referring to Figures 1, 2 and 3, the driving gear comprises a base plate A, an electric motor B and a support in the form of a gear casing C. The casing has two sets of feet 1a and 1b either of which sets can be secured to and mounted on the base plate. From one side of the gear casing C a shaft 2 projects and carries a driving sprocket wheel 3 driven from the motor B through a train of reduction gearing 3a in the gear casing C. Spaced apart longitudinally from the shaft 2, another shaft 4 projects laterally from the gear casing C and carries an idler sprocket wheel 5 in the same vertical longitudinal plane as the driving sprocket wheel 3. Two mountings at different levels from the wheel 3 are provided for the shaft 4, such mountings having an upper and a lower position marked 4a and 4b, respectively, in Figure 1. The coupling for the electric supply cable to the motor is shown at 6.

In the arrangement shown in Figure 1 the scraper chain, indicated by the dot-dash line D, comes in from the right and passes over and under the driving sprocket wheel 3. It then passes back to the right over and under the idler sprocket wheel 5 which is mounted in its lower position 4b. From the sprocket wheel 5 the chain passes away to the left. The chain thus follows an elongated S-shaped path over the sprocket wheels, being wrapped for fully 180° round the driving sprocket wheel. In Figure 3 the conveyor frame, in the form of troughing, is shown in dot-dash lines at E, the sprocket wheels of the driving gear being located under the troughing. Scrapers F of the return or lower run of the conveyor are also shown in this figure, the drive being applied to the lower run. As shown, the driving sprocket 3 is adapted to drive a single chain arranged centrally of the scrapers F.

Figure 8 shows how the driving gear just described is located to apply the drive to the lower run of the conveyor at a position away from the end sprocket wheels. It is assumed that the upper run is conveying from left to right. For the major part of the conveyor's length both runs D are low so that the troughing also will be low, but the conveyor is raised at the driving gear to pass over the sprocket wheels 3, 5 and is continued at a suitable elevation for delivery at the right hand end, the sprocket there being denoted by 8. If the driving gear should be arranged some distance from the delivery end the conveyor and its troughing could be brought down again. The sprocket at the opposite end is denoted by 9.

Figure 8 may be assumed to have the driving gear located at the side shown in Figures 4 and 5. If it is desired to locate the driving gear at the other side, the feet 1a are freed from the base plate and the motor and gear casing unit is inverted so that it stands upon the other set of feet 1b which are then bolted to the base plate. The arrangement is then as shown in Figures 6 and 7. The idler shaft 4 is transferred from the position 4b to the position 4a.

Figure 9 shows another conveyor lay-out in which the driving gear is incorporated in the upper run of the conveyor and which enables the conveyor and its troughing to be kept low in the region of the driving gear. The upper run of the conveyor in this lay-out conveys from right to left, the loading position being anywhere to the left of the driving gear. An additional idler sprocket wheel 7 is fitted over which the conveyor chain passes from the right-hand end sprocket wheel 8 of the conveyor. In this view the sprocket at the delivery end of the conveyor, namely the left-hand end is denoted by 9. The driving gear can be transferred to the other side of the conveyor by inverting it as described.

The slackness in the chain is generally on the side of the gear at which the chain leaves the gear, and where this is not achieved the gear may be positioned so that the slackness in the chain is accumulated outside the gear, adequate wrap of the chain on the driving sprocket wheel being maintained under both conditions.

The driving gear has been described as adapted for a conveyor having a single central chain but obviously it can be made suitable for conveyors having multiple chains by providing additional driving and idler sprocket wheels.

We claim:

1. A driving gear for a conveyor including an endless driving chain and end sprocket wheels round which the chain passes at the ends of the conveyor, the gear being made as an invertible unit that is constructionally separate from the conveyor so that it can be arranged either side up and at either side of the conveyor and the gear comprising a gear casing, a motor structurally associated with said casing, a driving sprocket wheel journalled on said casing, gearing in said casing between said motor and said wheel, said wheel being wrapped by the driving chain, and an idler sprocket wheel also journalled on said casing and being arranged coplanar with said driving sprocket wheel and engaging the driving chain to effect the wrapping thereof on said driving sprocket wheel, and alternative mountings on said casing respectively above and below the level of said driving sprocket wheel, in a selected one of which mountings said idler sprocket wheel is journalled as determined by the side of the conveyor at which the gear is positioned and by the side of the gear which is uppermost.

2. An invertible driving gear for a conveyor including an endless driving chain, the gear comprising a base, a gear casing with opposite sets of feet, one or the other of which sets of feet is secured to said base, a motor structurally associated with said casing, a driving sprocket wheel journalled on said casing, gearing in said casing between said motor and said wheel, said wheel being wrapped by the driving chain, an idler sprocket wheel also journalled on said casing and being arranged coplanar with said driving sprocket wheel and engaging the driving chain to effect the wrapping thereof on said driving sprocket wheel, and alternative mountings on said casing respectively above and below the level of said driving sprocket wheel, in a selected one of which mountings said idler sprocket wheel is journalled as determined by which of said sets of feet is secured to said base.

3. A driving gear for a conveyor including an endless driving chain, the gear being made as an invertible unit that is constructionally separate from the conveyor so that it can be arranged either side up and at either side of the conveyor and the gear comprising a support, a motor thereon, a driving sprocket wheel journalled on said support and driven by said motor, an idler sprocket wheel journalled on said support and being arranged coplanar with said driving sprocket wheel, and alternative mountings on said support respectively above and below the level of said driving sprocket wheel and both spaced therefrom longitudinally, in a selected one of which mountings said idler sprocket wheel is journalled as determined by the side of the conveyor at which the gear is positioned and by the side of the gear which is uppermost in relation to the driving chain which is trained round said driving and idler sprocket wheels in a longitudinally S-shaped path.

4. An invertible driving gear for a conveyor including an endless driving chain and end sprocket wheels round which the chain passes at the ends of the conveyor, the gear being made as an invertible unit that is constructionally separate from the conveyor so that it can be arranged either side up and at either side of the conveyor and the gear comprising a support, a motor thereon, a driving-sprocket-wheel mounting on said support, a driving sprocket wheel journalled in said mounting, said wheel being geared to said motor and laterally offset in relation thereto and said wheel being wrapped by the driving chain, idler-sprocket-wheel mountings on said support, the axes of said idler-sprocket-wheel mountings being respectively located above and below the level of the axis of said driving-sprocket-wheel mounting, and an idler sprocket wheel which is coplanar with said driving sprocket wheel and engages the driving chain, said idler sprocket wheel being journalled in one of said idler-sprocket-wheel mountings alternatively so as to effect the wrapping of said chain on said driving sprocket wheel, the mounting for said idler sprocket wheel being selected in accordance with the side of the conveyor at which the gear is positioned and by the side of the gear which is uppermost.

JAMES THOMSON.
THOMAS McCULLOCH.

REFERENCES CITED

The following references are of record in the file of this patent:

UNITED STATES PATENTS

| Number | Name | Date |
|---|---|---|
| 1,917,134 | Levin | July 4, 1933 |
| 2,066,383 | Andrada | Jan. 5, 1937 |
| 2,428,513 | Cooley | Oct. 7, 1947 |